Nov. 10, 1970 C. A. GLORIOSO 3,539,778

PHOTOELECTRIC READER

Filed June 9, 1966

INVENTOR
CHARLES A. GLORIOSO

BY R. C. Terry
ATTORNEY

United States Patent Office 3,539,778

Patented Nov. 10, 1970

3,539,778

PHOTOELECTRIC READER

Charles A. Glorioso, Chicago, Ill., assignor to Teletype Corporation, Skokie, Ill., a corporation of Delaware Filed June 9, 1966, Ser. No. 556,351

Int. Cl. G06k *5/00, 7/14;* G01n *21/00*

U.S. Cl. 235—61.11 13 Claims

ABSTRACT OF THE DISCLOSURE

A device for reading original documents and for detecting which of a plurality of marks on the document is the most opaque comprising a plurality of photosensitive devices each for sensing light passing through one of the marks on the document, means for detecting when each of the photosensitive devices has sensed a predetermined amount of light and means for detecting when all of the photosensitive devices except one have sensed the predetermined amount of light thereby determining the most opaque of the marks.

With the advent of high speed data processing and data transmitting machines it has become desirable to read directly documents or records which have been marked with a pencil or other marking device rather than to have such records read by a human operator who in turn prepares a tabulating card, a punched paper tape, etc. In the past the value of devices which read previously marked records directly has been limited by the requirement that the records be marked to a certain predetermined amount of opaqueness, by the requirement that such readers be adjusted in order to read records of different thickness, different color, etc. and by the fact that erasures or other spurious marks often caused erroneous readings.

Accordingly, an object of this invention is to provide a photoelectric reader which determines which of a plurality of positions on a record is the most opaque and which produces an output signal indicative of a mark in that position.

Another object of this invention is to provide a photoelectric reader which is not dependent on an absolute amount of opaqueness in order to detect a mark.

A further object of this invention is to provide a photoelectric reader capable of reading documents of various thicknesses, colors, etc. without adjustment.

A still further object of this invention is to provide a photoelectric reader which detects a mark in one of a plurality of positions regardless of the presence of erasures or other spurious marks in others of the positions.

In the preferred embodiment of the invention these and other objects are achieved by providing a plurality of photosensitive devices each individual to one of a plurality of positions on a record. The photosensitive devices are biased to a nonconductive state and are then simultaneously allowed to sense light which passes through the record onto the photosensitive devices. After all of the photosensitive devices except one have sensed a predetermined amount of light, which, for the purposes of this description, means the product of the intensity of the light sensed multiplied by time, sensing is stopped and an output signal indicative of a mark in the position on the record corresponding to the one photosensitive device which has not sensed the predetermined amount of light is emitted since this position is known to be the most opaque of all the positions sensed.

A more complete understanding of the invention may be had by reference to the following detailed description when taken in conjunction with the drawing wherein.

Figures 1, 3:
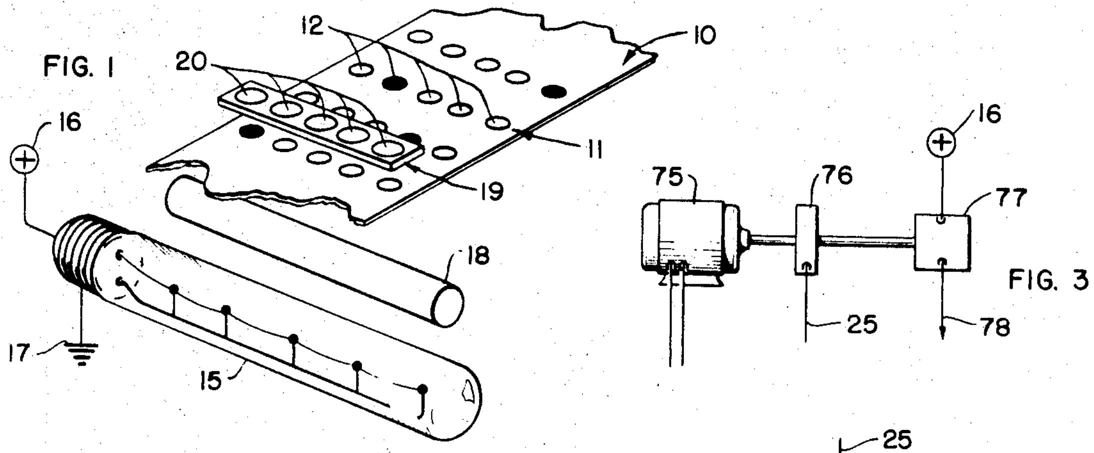
FIG. 1 is a schematic illustration of a photoelectric reader employing the present invention.
FIG. 3 is a schematic illustration of a mechanism useful for carrying out an alternative embodiment of the invention.

Referring now to the drawing wherein like reference numerals designate like parts throughout the several views there is shown in FIG. 1, a document or record card 10 having a plurality of rows 11 on it, each of the rows 11 having a plurality of spots or positions 12. In the device shown in FIG. 1 it is intended that one of the spots 12 in each of the rows 11 will be colored or otherwise made dark relative to the remaining positions 12 in any given row 11 by means of a pencil or other marking device and that the dark position 12 in each of the rows 11 will be selected as an original entry on the document 10. For example, the card 10 could be an answer sheet for an examination and the rows 11 could represent individual questions on the examination. Each of the spots 12 would then represent one answer to the question and a darkened spot 12 would represent a selected answer.

Positioned below the card 10 is a lamp 15 which is connected to a power source 16 and to a source of ground potential 17. The lamp 15 illuminates a cylindrical lens 18 which focuses light generated by the lamp onto individual rows 11 of the card 10. Means (not shown) are provided for moving the card 10 to position various ones of the rows 11 in alignment with the lens 18.

Positioned above and in alignment with the lens 18 is a bank of photosensitive devices 19. In the preferred embodiment the bank 19 is comprised of a plurality of photodiodes 20, one individual to each of the positions 12 in the rows 11. The photodiodes 20 are devices which generate an electric current in proportion to the amount of light striking them. Accordingly, in the embodiment shown in FIG. 1, it is intended that four of the photodiodes 20 will generate more current than the remaining photodiode 20 since the remaining photodiode 20 will be aligned with a position in a row 11 which is darkened.

Figure 2:
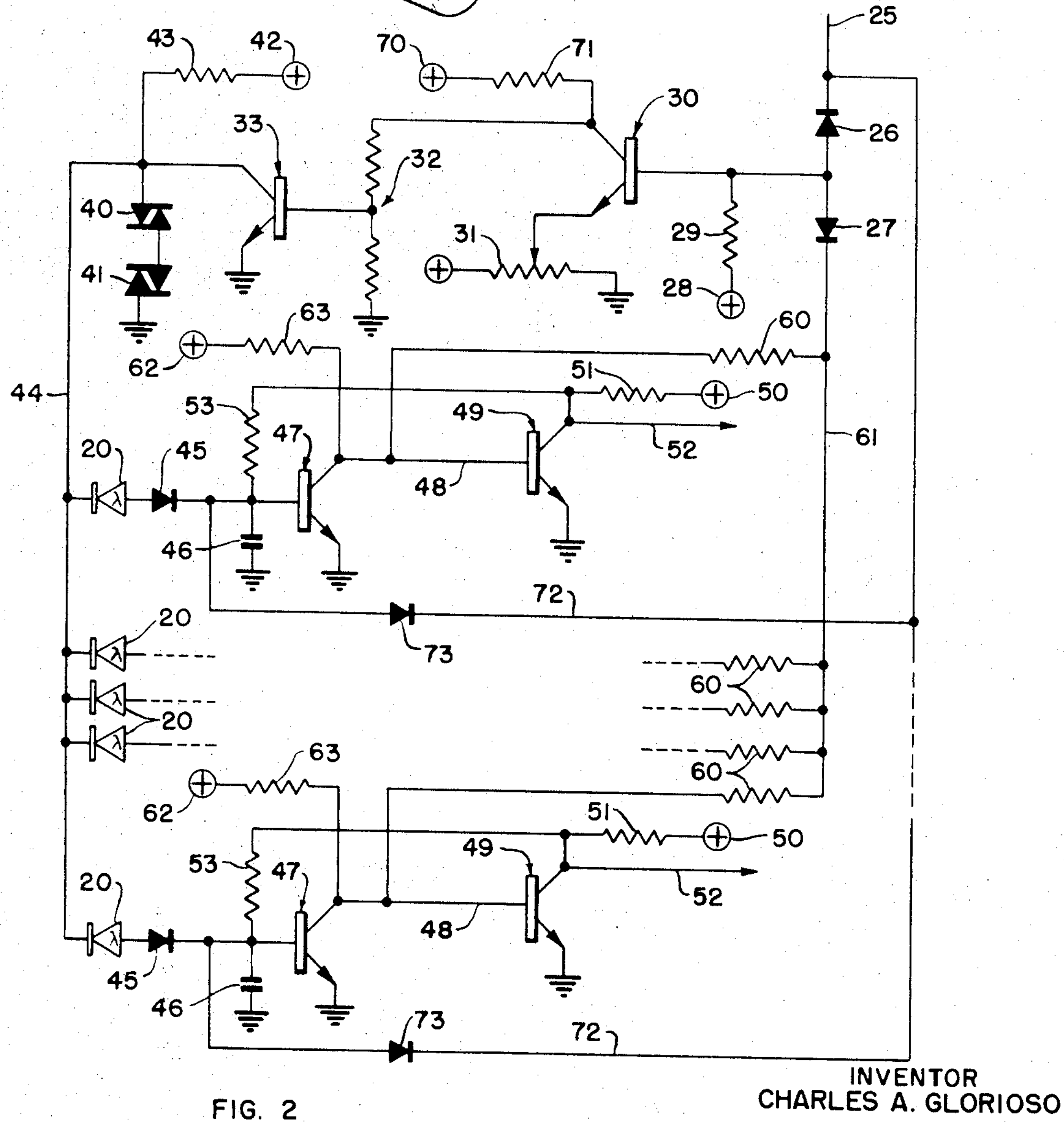
FIG. 2 is a schematic illustration of a circuit for controlling the photoelectric reader shown in FIG. 1.

Referring now to FIG. 2 there is shown a circuit for controlling the operation of the photodiodes 20 and for determining which of the positions 12 in each of the rows 11 is a darkened position. The photodiodes 20 are initially biased to a state of nonconduction. When it is desired to scan or examine one of the rows 11 on the card 10, a positive signal is applied over a lead 25 to a diode 26. Assuming that a positive signal is also applied to a corresponding diode 27, this causes a source of positive potential 28 to be applied through a resistor 29 to the base of a transistor 30. The emitter of the transistor 30 is maintained at slightly above ground potential by a variable resistor 31 and accordingly, when the positive potential 28 is applied to the base of the transistor 30, the transistor is rendered conductive.

When the transistor 30 is conductive, the potential on its collector drops to the slightly above ground potential present on its emitter and is applied to a voltage divider 32, which in turn applies a potential somewhat closer to ground than the potential on the collector or the transistor 30 to the base of a transistor 33. The values of the resistances comprising the voltage divider 32 are chosen so that when the transistor 30 is in a conductive stage, the transistor 33 is in a nonconductive state.

Whenever the transistor 33 is in a nonconductive state a pair of varistors 40 and 41, a source of positive potential 42 and a resistor 43 maintain a predetermined positive potential on a lead 44. This positive potential biases the photodiodes 20 and causes the photodiodes 20 to generate a current at the predetermined positive potential whenever light strikes them. The current generated by each of the photodiodes 20 passes through a diode 45 and charges a capacitor 46 to the predetermined positive potential. When sufficient current is generated by a given photodiode 20 to fully charge the capacitor 46 individual to that diode, a transistor 47 individual to that photodiode 20 and capacitor 46 is rendered conductive. Since the emitter of each of the transistors 47 is maintained at ground potential, this causes the potential on a lead 48 connected between the collector of the transistor 47 and the base of a transistor 49 to be driven to ground potential.

When the potential on the base of the transistor 49 is lowered to ground potential, the transistor 49 is rendered nonconductive causing the potential on the collector of the transistor 49 to rise to a positive potential which is applied from a source of positive potential 50 through a resistor 51 to a lead 52. The lead 52 is coupled to the base of the transistor 47 through a resistor 53 and accordingly, the positive potential on the lead 52 maintains the transistor 47 in a conductive state.

Since the photodiodes 20 are current generating devices and since the outputs of each of the photodiodes 20 is connected to a capacitor 46, the photodiodes 20 charge the capacitors 46 individual to them at a rate which is directly proportional to the amount of light striking the photodiodes 20. Accordingly, whenever one of the transistors 47 is rendered conductive and, therefore, a corresponding transistor 49 is rendered nonconductive, it is known that a predetermined amount of light has been sensed by the photodiode 20 corresponding to that transistor. Therefore, whenever a lead 52 becomes positive it is known that the photodiode corresponding to that lead 52 has sensed enough light to charge its corresponding capacitor 46 and to render its corresponding transistor 47 conductive. Therefore, by sensing the leads 52 and noting when four of the leads 52 have become positive, it is known that the remaining lead 52 must correspond to the dark position 12 of the row 11 being sensed since this lead 52 corresponds to a photodiode 20 which has not sensed enough light to charge its corresponding capacitor 46 to a value sufficient to render its corresponding transistor 47 conductive.

The fact that whenever four of the transistors 47 have been rendered conductive is indicative of the fact that the one remaining transistor 47 which is not conductive corresponds to the dark position 12 of the row 11 being sensed is used to terminate examination of a row 11. A plurality of resistors 60, one corresponding to each of the photodiodes 20, are individually connected to the leads 48 which are connected to the collectors of the transistors 47. The other terminals of the resistors 60 are connected to a lead 61 which forms the input to the diode 27. Whenever the transistors 47 are in a nonconductive state, the leads 48 are each maintained at a positive potential by the positive potential applied to the collectors of the transistors 47 from the source of positive potential 62 through a resistor 63. Accordingly, since all of the transistors 47 are initially in a nonconductive state a positive potential is initially maintained on the lead 61 so that when a positive signal is applied to the lead 25 the photodiodes 20 are biased to a state of conduction by operation of the transistors 30 and 33.

As individual transistors 47 are rendered conductive by the predetermined amount of light striking their respective photodiodes 20, the potential on the leads 48 which are connected to the collectors of the conductive transistors 47 is lowered to ground. This causes the potential on the lead 61 to be lowered in steps as various ones of the transistors 47 are rendered conductive. When the potential on the lead 61 becomes lower than the potential on the emitter of the transistor 30, as determined by the variable resistor 31, the transistor 30 is rendered nonconductive. This causes the potential applied to the collector of the transistor 30 from a source of positive potential 70 through a resistor 71 to rise to a positive value. This in turn causes a more positive potential to be applied to the base of the transistor 33 from the voltage divider 32, thereby rendering the transistor 33 conductive. This causes ground potential to be applied to the lead 44 and thus prevents the photodiodes 20 from charging their associate capacitors 46 any further.

If the output of the variable resistor 31 is adjusted to the voltage which is applied to the diode 27 when one of the resistors 60 is held at a positive potential by the source of positive potential 62 and the remaining resistors 60 are held at ground potential by the collectors of the transistors 47, the sensing of any given row 11 on the card 10 is terminated when all of the photodiodes 20 except one have sensed the predetermined amount of light. At this time the leads 52 corresponding to all of the photodiodes 20 except one will be at positive potential whereas the lead 52 corresponding to the photodiode 20 which has not sensed the predetermined amount of light will be maintained at ground potential. Thus, by examining the leads 52 a determination at which one of the positions 12 in the row 11 being examined is the dark position can be made.

After the leads 52 have been examined to determine which of the positions 12 is dark, a ground potential is applied to the lead 25. This ground potential is applied to the capacitors 46 and the bases of the transistors 47 through a lead 72 and diode 73 individual to each of the photodiodes 20. Since ground potential is applied to both sides of the capacitors 46, the capacitors 46 are discharged. When discharge of the capacitors 46 is completed, ground potential is applied to the bases of the transistors 47 thereby rendering them nonconductive. The positive potential 62 is then applied through the resistor 63 to each of the leads 48 and accordingly, positive potential is returned to the lead 61 and to the diode 27. This renders the circuit ready to start the examination of a new row 11 whenever a positive signal again is applied to the lead 25.

It should be noted that the circuit shown in FIG. 2 will indicate the darkest one of the positions 12 in any given row 11 irrespective of the opaqueness of any other position 12. Accordingly, the fact that erasures or other spurious marks are present in some of the positions 12 will have no effect whatsoever on the operation of the photoelectric reader shown in FIG. 1. It should further be noted that the photodiodes 20 will charge their associated capacitors 46 whenever they have sensed a predetermined amount of light regardless of how long it takes for them to sense that amount of light. Accordingly, the photoelectric reader shown in FIG. 1 and the circuit shown in FIG. 2 can be used with documents or records 10 of different thickness, different color, etc. without adjustment since the examination or scanning of individual rows 11 on the document 10 will continue until all of the photodiodes 20 except one have charged their associated capacitors 46 and have rendered their associated transistors 47 conductive.

Referring now to FIG. 3 there is shown a mechanism which can be employed in conjunction with the photoelectric reader shown in FIG. 1 and the circuit shown in FIG. 2 to form an alternative embodiment of the invention. The device shown in FIG. 3 is comprised of an electric motor 75 which is coupled to a single-revolution clutch 76 which is in turn connected to a rotary potentiometer 77. In the alternative embodiment of the invention the lamp 15 is not directly connected to the source of positive potential 16 but is in turn connected to the output 78 of the rotary potentiometer 77, the input of which is connected to the source of potential 16. The clutch 76 is tripped whenever ground potential is applied to the lead 25. When the clutch is tripped the rotary potentiometer 77 causes the lamp 15 to go from a very dim condition at which none of the photodiodes 20 generate enough current to render their associated transistors 47 conductive to a condition at which all of the photodiodes 20, including the photodiode 20 associated with the darkened position 12 in the row 11 being examined, receive sufficient light to render their associated transistors 47 conductive.

The circuit shown in FIG. 2 is altered slightly in the alternate embodiment by disconnecting the capacitors 46 from the circuit. As the light which impinges on the photodiodes 20 is raised in intensity the photodiodes 20 associated with non-darkened positions 12 render their associated transistors 47 conductive before the photodiode 20 associated with the darkened position 12 renders its associated transistor 47 conductive. Accordingly, the circuit shown in FIG. 2 is used to stop the examination of a given row 11 whenever all of the photodiodes 20 except one have received enough light to render their associated transistors 47 conductive.

The device shown in FIG. 3 may be used in conjunction with the circuitry shown in FIG. 2 in the reader shown in FIG. 1 to form yet another embodiment of the invention. In this embodiment the output of the potentiometer 77 is used to vary the gain of the transistors 47. The intensity of the lamp 15 is maintained at a constant value and the capacitors 46 are again disconnected. The gain of the transistor 47 is varied from a condition wherein none of the transistors 47 are capable of being rendered conductive by their associated photodiodes 20 to a condition wherein all of the transistors 47 would be rendered conductive, including the transistors 47 corresponding to the photodiode 20 associated with the darkened position 12 in row 11 being examined. Once again the circuit shown in FIG. 2 is used to stop examination of a given row 11 whenever all of the photodiodes 20 except one have rendered their associated transistors 47 conductive. At this time it is known that the one remaining transistor 47 which has not been rendered conductive corresponds to the photodiode 20 associated with the darkened position 12 in the row 11 being examined, and accordingly, the ground potential on the lead 52 corresponding to the nonconductive transistor 47 is different from the positive potential appearing on the remaining leads 52 and can be used to identify the darkened position 12.

Although only three embodiments of the invention are shown in the drawings and described in the foregoing specification, it will be understood that invention is not limited to the specific embodiments described, but is capable of modification and rearrangement and substitution of parts and elements without departing from the spirit of the invention.

What is claimed is:

1. A device for reading a record and for producing an output indicative of the presence of a mark in one of a plurality of positions on the record including:

a plurality of sensing members having first operative conditions indicative of the presence of a mark and having second operative conditions indicative of the absence of a mark, each of the sensing members being disposed in alignment with and corresponding to a different one of a plurality of positions on a record;

means for driving all of the sensing members from one of their operative conditions to the other of their operative conditions; and means responsive only to one of the sensing members in the operative condition indicative of the presence of a mark and the remaining sensing members in the operative condition indicative of the absence of a mark for producing an output signal indicative of a mark in the one position on the record in alignment with and corresponding to said one sensing member.

2. The device according to claim 1 wherein the driving means includes means for biasing all of the sensing members into their operative condition indicative of the presence of a mark and then driving all of the sensing members toward their operative condition indicative of the absence of a mark, and wherein the output signal producing means comprises means responsive only to a last sensing member failing to reach the operative condition indicative of the absence of a mark after all other sensing members have reached the operative condition indicative of the absence of a mark for producing a signal indicative of a mark in the position on the sheet corresponding to said last sensing member.

3. The device according to claim 1 wherein the sensing members are photosensitive elements which produce an electric output when light is directed onto them, wherein the operative condition indicative of the absence of a mark is a condition wherein a predetermined amount of light is directed onto the photosensitive elements, wherein the operative condition indicative of the presence of a mark is a condition wherein an amount of light less than the predetermined amount is directed into the photosensitive elements and wherein the output signal producing means produces a signal indicative of a mark in the position on the record sheet which directs the least amount of light onto its corresponding photosensitive element.

4. A device for reading a record and for producing an output indicative of the presence of a mark in one of a plurality of positions on the record including:

a plurality of photosensitive elements which produce an electrical output when light is directed onto them, having first operative conditions indicative of the presence of a mark wherein an amount of light less than a predetermined amount is directed onto the photosensitive elements, and having second operative conditions indicative of the absence of a mark wherein the predetermined amount of light is directed onto the photosensitive elements, each of the sensing members being individual to one of the plurality of positions on the record;

means for driving all of the photosensitive sensing elements from one of their operative conditions to the other of their operative conditions;

means for producing an output signal indicative of a mark in one of the plurality of positions on the record whenever the photosensitive element corresponding to that one position is in receipt of less than the predetermined amount of light and the remaining photosensitive elements are in receipt of at least the predetermined amount of light; and means for rendering the photosensitive elements insensitive to light directed onto them whenever all of the photosensitive elements except one have detected more than the predetermined amount of light.

5. A data translation device for providing an output signal indicative of a mark in one of a plurality of positions on a data record including:

means for passing light through the record;

a plurality of sensing members individual to each of a plurality of positions on a record for sensing the amount of light passing through the record to indicate the presence of a mark in any of said positions;

means for causing all of the sensing members to examine the positions on the record individual to them for a period of time determined by the amount of light actually passing through those portions of the record being examined; and means for causing the sensing members to stop examining the record after the sensing members have examined the record for the period of time.

6. The data translation device according to claim 5 wherein during the examination of the positions on the record each of the sensing members produces an electrical output signal indicating the nature of the position on the record individual to it and wherein the means for causing the sensing members to stop examining is a capacitive circuit which is driven by the electrical output of the sensing members and which causes the sensing members to stop examining after one of the sensing members has examined the portion of the record individual to it for longer than the period of time.

7. The data translation device according to claim 6 further including:
a plurality of inputs each individual to one of the sensing members and each having two states;
means responsive to the sum of the plurality of inputs for causing the sensing members to stop examining the positions on the record individual to them whenever the sum of the inputs is equal to a predetermined value; and
means for varying the state of individual ones of the inputs whenever the sensing member individual to them examines the position on the record individual to it for longer than the period of time and for thereby varying the sum of the inputs.

8. A photoelectric reader for distinguishing a dark position on a record from a plurality of non-dark positions on the record including:
means for directing light onto a plurality of positions on a record;
a plurality of photosensitive devices each associated with one position of the plurality of positions on the record for generating electrical outputs proportional to darkness of the positions individual to them;
a plurality of circuits each connected to one of the photosensitive devices and each for producing an output whenever the electrical output of the photosensitive device individual to it reaches a predetermined magnitude; and
means connected to all of the circuits for rendering the photosensitive devices insensitive to light whenever the electrical outputs of all of the photosensitive devices except one have reached the predetermined magnitude.

9. The photoelectric reader according to claim 8 wherein the photosensitive devices are photodiodes which generate an electrical current proportional to the darkness of the positions on the record sheet individual to them.

10. The photoelectric reader according to claim 9 wherein the circuits each contain a capacitor which is charged by the output of the photodiodes and a two-state transistor which changes state whenever the capacitor is charged.

11. A photoelectric reader for reading a plurality of marks on a document and for determining which of the marks is the most opaque including:
a plurality of photosensitive devices each positioned to sense light passing through a different one of the marks on the document;
means responsive to each individual photosensitive device sensing a predetermined amount of light for producing an indicating signal representative of such sensing by the individual photosensitive device; and
means responsive only to production of indicating signals by all of the photosensitive devices but one for producing a characteristic signal representing such production of indicating signals by all of the photosensitive devices but one.

12. A photoelectric reader for reading a plurality of marks on a document and for determining which of the marks is the most opaque including:
a plurality of photosensitive devices each for sensing light passing through one of the marks on the document;
means for detecting when each of the photosensitive devices has sensed a predetermined amount of light;
means for determining that all of the photosensitive devices but one have sensed the predetermined amount of light; and
means for terminating the sensing of light passing through the marks when the determining means determines that all of the sensing means but one have sensed the predetermined amount of light.

13. A photoelectric reader for reading a plurality of marks on a document and for determining which of the marks is the most opaque including:
a plurality of photosensitive devices each for sensing light passing through one of the marks on the document;
a plurality of circuits each individual to one of the photosensitive devices and each for producing an output whenever the photosensitive device individual to it senses a predetermined amount of light; and
means for determining that all of the photosensitive devices but one have sensed the predetermined amount of light.

References Cited

UNITED STATES PATENTS

| | | | |
|---|---|---|---|
| 3,189,745 | 6/1965 | Van Reymersdal | 250—214 |
| 3,192,388 | 6/1965 | Wu Chen et al. | |
| 3,201,569 | 8/1965 | Conron | 235—61.7 |
| 3,216,132 | 11/1965 | Flaherty et al. | 235—61.115 X |
| 3,303,329 | 2/1967 | Fritz | 235—61.11 |

DARYL W. COOK, Primary Examiner

R. M. KILGORE, Assistant Examiner

U.S. Cl. X.R.

235—61.6; 250—219